Patented Jan. 17, 1950

2,495,043

UNITED STATES PATENT OFFICE 2,495,043

LAMINATED PRODUCT AND PROCESS OF MAKING SAME

Grant S. Willey and Kenneth S. Ruthman, Chicago, Ill., assignors to United States Gypsum Company, Chicago, Ill., a corporation of Illinois No Drawing. Application October 8, 1943, Serial No. 505,586

21 Claims. (Cl. 154—133)

The present invention relates to laminated products, particularly of the type which are produced from lignocellulosic material, such as wood, pulp, paper, wood veneers and the like, by a process which involves the formation of acid decomposition products of the lignocellulosic constituent of the laminations as a bonding agent.

In its broader aspects are invention concerns itself with the production of hard, dense, laminated products which may be made from sheets of lignocellulosic material such as wood veneers, mats of interlaced lignocellulosic fiber, or webs of paper which have been caused securely to adhere to each other by having been treated on their surfaces with acid-reacting substances and then consolidated under heat and pressure, using a high enough temperature to develop binding materials at the surfaces of the various layers with the result that they adhere to each other to form a strong laminated product highly resistant to aging, water and water-vapor, and various extremes of weathering.

Laminated products made from veneers, paper and the like, have been made for many years by the expedient of applying to their surfaces certain well known adhesives or bonding agents, such as animal or vegetable glues, casein and other protein solutions, starches, dextrin, and particularly various types of synthetic resins, such as phenolic resins, urea formaldehyde condensation products, vinyl resins, and the like. In all of such cases, however, it was necessary to use a separate and distinct adhesive material to effect the bond. This not only was cumbersome but also expensive, and so far as the present inventors know there had not been proposed any process in which the material to be laminated itself was utilized as the source of the bonding materials.

Applicants have discovered that lignocellulosic material is capable, when first treated with or having applied thereto an acid-reacting substance, of acquiring what might be termed an activated surface which contains latent bonding potentialities by means of which it is possible to effect the lamination of the materials and their mutual adherence. To effect this it is necessary to heat the sheets and to press them firmly together, the pressure varying from 100 pounds to say 2500 pounds per square inch and the temperature varying from about 300° F. up to nearly the carbonization point of lignocellulose, or in general, an upper limit of about 550° F. Generally speaking, the pressure affects primarily the density of the resulting products while the temperature affects the time of the operation, although the pressure, time and temperature are somewhat more indirectly interrelated. It might be stated as a generality that at the higher temperatures a somewhat lesser pressure may be used, or that if the same pressure is used a more dense product would be obtained if the temperature is higher.

The process may be applied for the manufacture of plywood from wood veneers, the manufacture of what is commercially known as "hardboard" from a plurality of relatively light and porous mats of interlaced lignocellulosic fibers, such as are exemplified by the insulation board of commerce, or by the building up of a heavy cardboard having many of the properties of hardboard built up from laminations of paper. The invention is, however, not limited merely to the production of flat sheets, but lends itself quite well to the production of more intricate shapes and the formation of articles having more or less indented or embossed ornamental surface effects. It has been found that if the surface of each sheet which is to be consolidated into the form of a homogeneous board or other product, is first lightly painted with a dilute solution of an acidic material, such for example as sulfuric acid, then dried, and thereafter consolidated by heat and pressure, the resulting product is found to be welded into a single coherent piece which it is practically impossible to delaminate and which would be quite resistant to the effects of water or moisture in other form. At the interface or bonding points between each sheet there will have formed a darker colored, harder thin layer of fibers which are so well cemented together that even after long soaking in water the bond will not fail, and hence the laminated product will remain intact.

It was already known that in the commercial manufacture of hardboard by the now well-known hot dry pressing methods, it was possible to consolidate a light porous mat of lignocellulosic material, such as made from ground wood pulp, into a sheet of hardboard at a temperature within the range of from about 350° to 550° F. Particularly above 400° and in the absence of accelerating chemicals, certain chemical changes were known to take place as a result of the thermolysis of the lignocellulosic constituent of the fibers as a result of which an autogenously formed binder was developed. While such a binder was found to be amply sufficient for the production of hardboard from thoroughly interlaced fibers such as are found in commercial insulation board, this binder was not sufficiently strong to effect a bond between two separate mats or sheets. However, by the use of the present invention, the acidic material appears to catalyze the reaction or in some other way to bring about the formation of a sufficiently strong binding film at the interface between the sheets so that they become bonded together. It has been found that quite a number of acid-reacting materials may be used for carrying out the present process, providing that the materials are either inherently acid in reaction or at least are capable of generating acidic materials under the influence of heat. Materials which have been found useful for carrying out the present process are: sulfuric acid, nitric acid, ferric sulfate, ammonium sulfate, acid sodium sulfate, zinc chloride and acetic acid. The common property possessed by these materials is that they are strongly acid-reacting materials.

In general, the process is carried out by applying to the individual laminations, at least on those surfaces which are to contact a second lamination, a solution of the acid-reacting materials in properly proportioned amounts, as hereinafter indicated in connection with the individual examples. The solvent, for instance water in the case of aqueous solutions, is then removed by volatilization or drying, and the dried sheets, which have then been coated with the acid-reacting materials, are superimposed and are then placed between the platens of a hydraulic press and are therein heated to the desired temperature and subjected to the desired pressure. The heating may be accomplished in a number of ways. Thus the sheets may be preheated before being placed in the press. The platens of the press, or at least the caul plates thereof, may be heated as by steam, electricity, the circulation of hot liquids therethrough, or by direct impingement thereon of the flame. Very advantageously the heating may be accomplished by the passing of high frequency oscillations through the noncontacting materials of which the laminations are composed, thus heating them both exteriorly and interiorly at the same time. This may, for instance, be accomplished by making the platens the termini of one side of the high frequency oscillator and placing a metallic intermediate sheet between each of two stacks of materials which are to be laminated together, this metallic sheet being the other terminus of the high frequency oscillator. This type of heating is sometimes spoken of in the industry as "high frequency heating," and has become fairly well established in the art of making, for instance, plywood and similar products. The invention, therefore, is not limited to the particular type of heating employed, but is to be interpreted within the terms of the hereunto appended claims without reference to the particular mechanical instrumentalities which are employed for effecting the operations of the process.

Moreover, the methods of applying the solutions of the acid-reacting materials are also subject to a wide choice. Thus appropriately concentrated solutions of the acid-reacting materials may be applied to the sheets by spraying, roller coating, painting, or, if desired, by immersion of the sheets, such for example as by passing a continuous web thereof through a dilute solution of the acid-reacting material. In any event, after the sheets have been coated with the acid-reacting material, they are to be dried so that the lamination and bonding will be effected with a very low moisture content, say not above 2 per cent of actual moisture. The process may be very advantageously carried out with the sheets and the acid-reacting material in substantially the "bone dry" condition, as it appears that moisture is not necessary for the effective operation of the process. There will now be given a number of specific examples for the carrying out of the present invention, but it is to be definitely understood that these are merely by way of explanation and are not to be considered as limitations upon the breadth and scope of the present invention.

*Example 1*

According to this example, a hardboard having a final thickness of about ¼ inch is produced by combining two sheets of water-formed fiber board, each sheet being of the size which normally would be used to make a ⅛ inch hardboard. The necessary "mats" for the carrying out of the invention are made by grinding in a well known manner suitable wood, such as willow, cottonwood, and the like, on stone wheels in the presence of water, to produce a suspension of pulp from which boards are formed on the usual type of rotary board former, such as an Oliver machine or Fourdrinier wire. If desired, and quite advantageously, a small amount of rosin size may be precipitated upon the fibers while they are still in water suspension and there may also be added, if desired, a small amount of an emulsion of a waterproofing material, such for example, as linseed oil emulsified by a suitable wetting agent such as a soap. The rosin and oil may be precipitated upon the fibers by means of a precipitant such as aluminum sulfate or ferric sulfate. In any event, the suspension of fibers is formed into a board on a board machine and the resulting mats are dried in the usual type of Coe drier. After drying there is applied to one surface of each of the mats, as thinly as possible, say a 2 percent solution of ferric sulfate using an amount of solution so that about 22½ grams thereof will be applied to every square foot of the eventually contacting surfaces of the mats. This therefore amounts to 0.450 gram of ferric sulfate on every square foot of the contacting surfaces. The solution may be applied by roller coating or by spraying or brushing. In any event, the boards are again dried so as to remove the moisture which has been introduced with the ferric sulfate solution and the two mats are then placed, with their coated surfaces in contact with each other, between heated press platens between which they are pressed at a temperature of about 472° F. for three minutes with a pressure of about 1300 pounds per square inch. The result will be a homogeneous hardboard about ¼ inch in thickness and perfectly bonded. The dividing line between the two mats has practically disappeared and no amount of soaking in water will cause the two separate original laminations to become separated from each other.

Self-evidently, thicker board may be made by either employing thicker original mats or by superimposing a larger number of individual layers, taking care, of course, that the contacting surfaces are first coated as herein described with ferric sulfate or other acid-reacting material.

*Example 2*

In accordance with this example, a hardboard about 0.064 inch thick is made from individual sheets of paper. A suitable paper is first made from a paper furnish containing about 85 per cent (dry weight) of what is known as "No. 2 old books" which is primarily derived from ground wood pulp and therefore contains lignocellulose just as the ground wood of Example 1. The paper furnish also contains about 15 percent of waste kraft paper. The pulp after suitable beating is sized with about 3 percent of rosin size set with about 1 percent of ferric sulfate; these percentages all being based on the dry pulp weight. From the pulp thus made there is produced, by the usual method involving a paper machine, paper having a weight of about 80 pounds per 1000 square feet. A similar batch of paper is also made containing about 6 percent of a pigment, for example, red oxide, which is added to the pulp prior to the addition of the ferric sulfate precipitant and this colored stock is made into paper weighing about 30 pounds per 1000 square feet. This colored paper is intended to constitute the outer surface of the eventual product. The uncolored dry paper sheets have applied to each side thereof a sufficient amount of a 1 percent solution of ferric sulfate so as to provide on each square foot of each side about 0.04 gram per square foot of ferric sulfate. The colored sheets are similarly coated, but only on the side which is intended to be the inside, but remain uncoated on that side which is intended to be the outside of the product. The sheets are then collated, using four sheets of uncolored paper and at least one surface sheet of the colored paper, the latter with this untreated side outward. Of course, another sheet of uncolored paper may be used if both sides of the product are intended to be colored. The resulting assembly is then pressed between the platens of a press employing a temperature of about 470° F. It is advantageous to start out with a pressure of only about 100 pounds per square inch for a period of about one minute, and then to build up the pressure to say 2000 to 2500 pounds for another minute and a half, making a total operation of from 2 to 2½ minutes. The resulting product will have a thickness of about 0.064 inch, will be permanently bonded and welded together into one compact mass which has all the appearance of a thin hardboard, and the bond between the plies will be harder and stronger than the body of the plies. The sheet thus made has a density of about 72 pounds per cubic foot and a modulus of rupture of about 8130 pounds per square inch. Even when soaked in water at 70° F. for 24 hours it remains homogeneous and although it will take up in that period about 25 percent of water, there is no indication of the failure of the bond.

Obviously this process may be modified to produce a paper sheet from a lignocellulosic stock, such, for example, as newsprint groundwood, on any conventional multi-cylinder type of paper machine. Several such layers may be bonded together. When pressed it will readily be seen that there are many advantages to the present operation inasmuch as sheets can be made which could not be produced by pressing a single layer unless a very special machine were used because such a pulp is very slow draining. The rather thick paper sheets thus made may then be surface coated with an acid-reacting material, such as for example the ferric sulfate just mentioned, and then pressed into somewhat thicker products than the thinner boards just described.

The process may, for instance, be utilized for the formation of chair seats, disposable dishes, boxes and the like, by using suitably shaped molds. By reason of the fact that the paper sheets are rather flexible, it is relatively a simple matter to press the assembly into a curved shape and to consolidate the entire product in the form which it is intended ultimately to have. Inasmuch as the individual laminations of the assembly tend to move relatively to each other prior to consolidation, they can be made to form to a complex surface in a manner which would be quite impossible if a thick homogeneous mat were to be pressed.

It will be self-evident that the surface sheet may have suitable ornamentations thereon and that decorative effects in the nature of an inlay may be produced by using different tops and differently colored outer layers. The introduction of reinforcing material into the interior of the laminated product, such as wire, metal mesh, canvas or cloth, is, of course, within the skill of the art and is to be considered as contemplated by the present inventors in the application of their process to industrial uses. It is also possible to make objects of variable thickness and of uniform density by varying the number of plies at different points and having a suitably shaped mold. Also of course it would be possible to make flat or curved pieces of uniform thickness but varying in density on different areas.

*Example 3*

In accordance with the present example, plywood is made from individual wood veneer sheets using ferric sulfate as the acid-reacting material. The raw material for the process was $\frac{1}{16}$ inch cottonwood veneer. This example also includes certain experimental data which are given as a guide to the amount of material to be used and some of the subsidiary examples herein were made with an amount of the ferric sulfate solution, while others contained varying amounts with varying results. The example therefore is divided up into five, designated respectively (a), (b), (c), (d) and (e).

(a) A ⅓ percent solution of ferric sulfate was applied to the veneers in the amount of 9 grams of solution per square foot and the veneer then dried to bone dryness. This therefore amounts to 0.03 gram of ferric sulfate per square foot.

(b) A 3 percent ferric sulfate solution in an amount of 9 grams thereof per square foot was applied to the veneer, thus producing a concentration of 0.27 gram of ferric sulfate per square foot.

(c) A 9 percent ferric sulfate solution was applied at the rate of 9 grams thereof per square foot, yielding a concentration of 0.81 gram of ferric sulfate per square foot.

In each of the cases (a), (b) and (c), the bone dry sheets were stacked three high and laminated together at about 350° F. with a pressure of about 500 pounds per square inch for two minutes. Under those conditions, Example (a) gave no bond. (b) showed the beginnings of the formation of the bond, and (c) gave a good bond. However, even the application of very high pressure, say up to 8000 pounds per square inch, in the case of (b) containing 0.27 gram of ferric sulfate per square inch, did not improve the bond.

Further pressings were made of both (b) and (c) at 400° F. and a pressure of 500 pounds per square inch. (b) gave somewhat better results, but still was not considered to be a satisfactory bond. However, (c) which contained 0.81 gram of ferric sulfate per square foot gave as good a bond as when it had been pressed at 350° F. but the resulting sheet was more dense, which is attributable to the use of the higher temperature.

Based on these observations, further tests were made with somewhat larger amounts of ferric sulfate.

(d) This was made with an application of one gram of ferric sulfate per square foot, derived from a 10 percent ferric sulfate solution.

(e) This was made with the application of two grams of ferric sulfate per square foot using a 10 percent solution of ferric sulfate to which there had been added a wetting and evaporating agent so as to cause the further penetration of the ferric sulfate solution into the surfaces of the veneer sheets. The particular wetting agent was a product known as DuPont MP-189 which it is understood is a sulfonated long chain aliphatic unsaturated acid salt.

In the case of both (d) and (e) the sheets were bone dry and then pressed for 2 minutes at only 300° F. with a pressure of 500 pounds per square inch. Both of them yielded excellently bonded plywoods.

From this example it will be seen that plywood can be made at temperatures from about 300° F. and upward. It was also found that if the quantity of ferric sulfate was somewhat greater, the temperature could be somewhat lower and if less ferric sulfate were used, the temperature would have to be a little higher. Instead of ferric sulfate, one may use corresponding amounts of the other acid-reacting materials already indicated.

Example 4

To demonstrate the utility and behavior of the other acid-reacting materials, the present Example 4 is given. A series of materials were used employing, with one exception, in every case, 0.10 gram of the acid-reacting material per square foot of surface to be laminated. The laminating sheets themselves were made up of a coarsely ground hardwood pulp. Under the circumstances, it was found that when using sulfuric acid one would require only about one-half as much by weight as would be used of ferric sulfate. The application of the chemicals listed hereinbelow was from a 1 percent aqueous solution thereof, and in each case the sheets were then bone dried and pressed at 485° F. for one minute with the application of a pressure of 1500 pounds per square inch. The results are shown in Table I.

Table I

| Treatment in Grams per Sq. Foot of Each Surface to be Laminated | Bond |
|---|---|
| .10 gram Sulfuric Acid | Good. |
| .10 gram Ferric Sulfate | Do. |
| .10 gram Ammonium Sulfate | Do. |
| .10 gram Sodium Acid Sulfate | Do. |
| .10 gram Nitric Acid | Do. |
| .10 gram Zinc Chloride | Do. |
| .30 gram Acetic Acid | Bond but not quite as good. |

It will be noticed that in the case of acetic acid, three times as much was used because acetic acid is known to be a weaker acid than an inorganic acid such as sulfuric or nitric.

The advantages of the present invention are primarily that the amount of bonding material employed between the laminations is almost infinitesimal in amount and is far below the amounts of any kind of bonding agent which has ever been used. For instance, comparing the invention with what preceded it, it was usually necessary when laminating with synthetic resins to have the fiber sheets practically saturated with the resin. In the case of resin-bonded paper sheets, for example, the amount of synthetic resin in the sheet often reached as high as 50 percent. On the contrary, in the case of the present invention, for instance when laminating together four sheets of paper one square foot in extent, and making a sheet of a weight of 0.4 pound per square foot, there would be applied thereto only 0.04 gram of the acid-reacting material on two sides and to one side of the two outer sheets, or a total of 8×0.04=0.32 gram. The paper itself would weigh 182 grams and therefore the amount of "binder" used would only be 0.172 percent as compared with 50 percent when making a resin-bonded laminated product. Moreover, the acid-reacting materials used in place of the adhesive cost on the average, such as in the case of ferric sulfate and sulfuric acid, only about 2¢ per pound as compared with the cost of commercial plastics or glues of anywhere from 10¢ to 30¢ per pound. Taking an average, say of 20¢ per pound, the cost average thus becomes $$\frac{50}{0.172} \times 10 = 2900$$

In other words, the cost of effecting the adhesion in accordance with the present invention is 3000 times cheaper than anything hitherto known. The far-reaching extent of this simplification and reduction in cost when manufacturing laminated sheets strongly bespeaks the startling and unexpected nature of the present invention.

Applicants are aware that paper pulp has been hydrolyzed at superatmospheric pressure by means of acid in order to partly hydrolyze the sheets to form a form of hydrocellulose which is then depended upon as a bonding agent. However, under those conditions, at least 30 percent of the wood pulp is rendered soluble and is lost when making up sheets and is thus utterly wasted. In accordance with the present invention, however, substantially all of the wood pulp gets into the final product. Moreover, in the case of the laminated sheets made with prior art so-called "hydrated" or "hydrolyzed" pulps, they are found to be very brittle and hence quite objectionable, whereas when operating in accordance with the present invention, the original toughness of the wood fibers is retained even without the use of any plasticizers.

Having thus described their invention and given a number of exemplifications thereof for purposes of better illustration, the applicants claim:

1. Process of producing lignocellulosic hardboard from a plurality of mats of lignocellulosic fiber which comprises coating at least the contacting surfaces of said mats with about 0.450 gram of ferric sulfate per square foot, drying the thus coated mats, and pressing them at about 472° F. under a pressure of about 1300 pounds per square inch for about three minutes.

2. Plywood in which the veneers are laminated by an autogenous surface binder produced by the thermolytic reaction products of dry lignocellulose and a minor amount, within the range of from about 0.03 to 2.0 grams per square foot of contacting surfaces of the laminations, of a substantially anhydrous strongly acid-reacting acidic material.

3. The product of claim 2 wherein the acidic material is ferric sulfate.

4. The product of claim 2 wherein the acidic material is sulfuric acid.

5. The product of claim 2 wherein the acidic material is ammonium sulfate.

6. Process of forming laminated articles from substantially dry laminations consisting essentially of lignocellulosic fibers which comprises incorporating with at least the surfaces of said laminations from about 0.03 to about 2.0 grams per square foot of a substantially anhydrous strongly acid-reacting acidic material, and subjecting the thus treated laminations to a consolidating pressure of at least 100 lbs. per sq. in. at a temperature of at least about 300° F.

7. The process of claim 6 wherein the acidic material is ferric sulfate.

8. The process of claim 6 wherein the acidic material is ammonium sulfate.

9. The process of claim 6 wherein the acidic material is sulfuric acid.

10. A hard, dense, consolidated, laminated lignocellulosic product the lamina of which are strongly cemented together at the interface by an autogenous binder formed by the thermolysis of the lamina surface in the presence of a minor amount within the range of from about 0.03 to 2.0 grams per square foot of contacting surfaces of the laminations of a strongly acid-reacting lignocellulose-attacking material.

11. The product of claim 10 wherein said acid-reacting material is ferric sulfate.

12. The product of claim 10 wherein said acid-reacting material is ammonium sulfate.

13. The product of claim 10 wherein said acid-reacting material is sulfuric acid.

14. Process of forming laminated articles from substantially dry, rigid or semi-rigid lignocellulose sheets which comprises incorporating a minor amount within the range of from about 0.03 to 2.0 grams per square foot of contacting surface of the laminations of substantially anhydrous strongly acid-reacting acidic material with the surface of said sheets, causing an autogenous formation of a laminatable surface by means of thermolysis and completing the lamination by means of heat and pressure, within the range of from about 300° F. to about 550° F. and from about 100 to 2500 pounds per square inch.

15. Process of forming laminated articles from substantially dry, rigid or semi-rigid lignocellulose sheets which comprises applying to the surface of said sheets a dilute solution of strongly acid-reacting acidic material in sufficient quantity to deposit a minor amount, within the range of from about 0.03 to 2.0 grams per square foot of contacting surface of the laminations of said acidic material on the sheet's surface, drying said acid-coated surface, causing an autogenous formation of a laminatable surface by means of the thermolysis of the lignocellulosic components of said sheets and completing the lamination by means of heat and pressure, within the range of from about 300° F. to about 550° F. and from about 100 to 2500 pounds per square inch.

16. Process of producing laminated articles from laminations comprising lignocellulosic fibers which comprises coating at least the contacting surfaces of said laminations with from about 0.03 to 2.0 grams per square foot of a strongly acid-reacting acidic material deposited from dilute solution, drying the thus coated laminations and subjecting them to a temperature of from about 300° F. to about 550° F. and a pressure of between 100 and 2500 lbs. per sq. in.

17. The process of claim 16 in which the acidic material is ferric sulfate.

18. The process of claim 16 in which the acidic material is ammonium sulfate.

19. The proces of claim 16 in which the acidic material is sulfuric acid.

20. Process of producing a dense board-like product form lignocellulose-containing paper which comprises coating paper with a solution of a strongly acid-reacting lignocellulose attacking substance in an amount sufficient to provide from about 0.3 to about 2.0 grams of said substance per square foot, drying the thus coated paper, superimposing a plurality of sheets of said coated paper upon each other, and pressing them into a coherent board-like product at a temperature of from about 300° F. to 550° F. under a pressure of between 1200 and 2500 lbs. per sq. in.

21. Process of producing a dense board-like product from lignocellulose-containing paper which comprises coating paper with a solution of ferric sulfate in an amount sufficient to apply to each side of said paper about 0.04 gram of ferric sulfate per square foot, drying the thus coated paper, superimposing a plurality of sheets thereof, and pressing them into a coherent board-like product at between 300° F. and 550° F. and a pressure of between 100 and 2500 lbs. per sq. in.

GRANT S. WILLEY.
KENNETH S. RUTHMAN.

REFERENCES CITED

The following references are of record in the file of this patent:

UNITED STATES PATENTS

| Number | Name | Date |
| --- | --- | --- |
| 322,629 | Morrow | July 21, 1885 |
| 510,424 | Hanna | Dec. 12, 1893 |
| 726,029 | Classen | Apr. 21, 1903 |
| 1,156,753 | Carey | Oct. 12, 1915 |
| 1,465,882 | Tingle | Aug. 21, 1923 |
| 1,631,750 | McIntosh | June 7, 1927 |
| 1,757,756 | Schwartz | May 6, 1930 |
| 1,772,502 | Sweeney | Aug. 12, 1930 |
| 1,824,421 | Allen | Sept. 22, 1931 |
| 1,892,873 | Darrah | Jan. 3, 1933 |
| 2,018,244 | Alm | Oct. 22, 1935 |
| 2,153,316 | Sherrard et al. | Apr. 4, 1939 |
| 2,156,160 | Olson et al. | Apr. 25, 1939 |
| 2,215,245 | King | Sept. 17, 1940 |
| 2,303,345 | Mason et al. | Dec. 1, 1942 |
| 2,388,487 | Linzell | Nov. 6, 1945 |